United States Patent [19]
Haruyama

[11] Patent Number: 5,291,527
[45] Date of Patent: Mar. 1, 1994

[54] COMMUNICATION SYSTEM AND DEMODULATOR USED IN COMMUNICATION SYSTEM

[75] Inventor: Hideaki Haruyama, Kanagawa, Japan

[73] Assignee: Kabushiki Kaisha Toshiba, Kanagawa, Japan

[21] Appl. No.: 798,775

[22] Filed: Nov. 27, 1991

[30] Foreign Application Priority Data

Nov. 29, 1990 [JP] Japan ................. 2-325255

[51] Int. Cl.⁵ .......................................... H04L 27/06
[52] U.S. Cl. ........................................ 375/94; 375/106
[58] Field of Search ............... 375/39, 106, 107, 94; 370/20, 95.3

[56] References Cited

U.S. PATENT DOCUMENTS 3,613,019 10/1971 Muratani ................ 375/120 X
4,918,718 4/1990 Emmons et al. ............ 375/39 X

OTHER PUBLICATIONS

The Transactions of the Institute of Electronics and Communication Engineers of Japan, "Time Slotted Bus System With Control Window", vol. J69-B, No. 10, Oct. 1986, pp. 1083-1091.

Primary Examiner—Curtis Kuntz
Assistant Examiner—Tesfaldet Bocure
Attorney, Agent, or Firm—Finnegan, Henderson, Farabow, Garrett & Dunner

[57] ABSTRACT

A communication system having a plurality of communication stations and a modulation transmission line for transmitting a burst modulation signal between the plurality of communication stations in time division multiple access, at least one of the plurality of communication stations comprising, sampling timing generating device for generating a sampling timing whose bits have been synchronized with the burst modulation signal before receiving the burst modulation signal transmitted from another communication station, quasi-synchronous detecting device for quasi-synchronously detecting the burst modulation signal and for successively outputting a first vector signal on a phase plane, sampling device for successively sampling the first vector signal obtained by the quasi-synchronous detecting device in a sampling timing generated by the sampling timing generating device, phase rotation amount estimating device for estimating a phase rotation amount of the first vector signal in accordance with a correlation among a particular number of the first vector signals sampled by the sampling device, and phase compensating device for compensating the phase of the first vector signal in accordance with the phase rotation amount estimated by the phase rotation amount estimating device.

18 Claims, 7 Drawing Sheets

COMMUNICATION SYSTEM AND DEMODULATOR USED IN COMMUNICATION SYSTEM

BACKGROUND OF THE INVENTION

1. Field of the Invention

The present invention relates to a communication system, in particular, relates to a communication system using quasi-synchronous detection for use in a high speed burst communication over a modulation transmission line.

2. Description of the Related Art

Since time division multiplex access (TDMA) using a modulation transmission line can more flexibly change information transmission speeds of child stations with a single modem than frequency-division multiple access (FDMA), the TDMA has been widely studied, developed, and utilized for fixed and mobile radio communications, and communications over tree shaped networks using coaxial cables.

With respect to the modulation and demodulation, one of technical problems to be solved to enhance the efficiency of the TDMA is how to remove the acquisition of carrier synchronism. In other words, by removing a carrier synchronous field of each burst signal transmitted from each station, the efficiency of using frames can be enhanced.

A technique for solving such a problem which has been used is asynchronous detection typified by delay detection. However, in the delay detection, a delay amount with a satisfactorily high accuracy should be provided for 1/fc sec where fc is the frequency of an IF carrier. Moreover, the delay detection is inferior to the synchronous detection with respect to the C/N to bit error rate (BER) property. It is known that when for example a four-phased phase modulation signal is detected, the delay detection is inferior to the synchronous detection theoretically by 2.3 dB in the C/N ratio for obtaining the same BER. As the modulation system uses many values and many phases, the deterioration of the C/N ratio in the delay detection tends to correspondingly increase.

Recently, a system having the same C/N to BER property as the synchronous detection without necessity of an acquisition field of carrier synchronism for each burst has attracted public attention and studied. In this system, many points of a quasi-synchronous detection signal are sampled and then stored in memory. Thereafter, the stored signal is digitally processed and then a clock, carrier frequency, and carrier phase rotation amount are estimated so as to demodulate the data.

The quasi-synchronous detection is a method for freely running an oscillated signal of a local oscillator used for converting an IF signal into a base band signal in the vicinity of the IF carrier frequency without feeding back the signal like the Costas system or the PLL system.

In this system, of course, it is not assured that the in-phase component (Is) and the quadrature component (Qs) are perfectly separated. Generally, a vector (Is, Qs) is obtained by rotating the phase of a vector (Ic, Qc) by an angle $\theta$. where Ic is an in-phase component and Qc is an quadrature component. In addition, $\theta$ can be represented with for example the following linear function for a time t.

$$\theta = 2\pi \times t \times (fL - fC) + \theta_O$$

where $\theta_O$ is a constant specific to each burst, fc is a carrier frequency of an input IF signal, fL is a local oscillation frequency.

In the quasi-synchronous detection system which has been used, since the bit synchronization for the burst signal is not established, before a burst signal is received, the burst signal should be sampled at many points by using a clock with a frequency which is at least several times as high as the transmission speed (baud rate) of the signal as described above.

The sampling at many points results in increasing the data amount and requiring to estimate a timing, phase, and, when necessary, frequency from a large amount of data. Thus, since the calculation amount becomes huge, the signal speed is significantly affected by the processing capacity of the calculation system.

Practically, in a demodulator according to the quasi-synchronous detection method which was reported in Spring Conference, The Institute of Electronics, Information and Communication of Japan, held on March 1989, a digital signal processing LSI could demodulate a four-phased phase modulation signal of at most 250 k baud.

As described above, when the quasi-synchronous detection having the same bit error rate as the synchronous detection system without necessity of a field for acquiring carrier synchronism is performed, since an optimum sampling timing cannot be known before a burst signal is received, the burst signal should be sampled at many points and the huge data being obtained should be processed in complicated ways. Thus, the device becomes complicated and high speed burst communication becomes difficult.

The present invention was made to solve the above mentioned problems.

SUMMARY OF THE INVENTION

An object of the present invention is to remarkably improve the signal processing speed and simplify the apparatus by necessarily minimizing the sampling data amount per symbol in a demodulation system using the quasi-synchronous detection and by reducing the types of physical amounts to be estimated.

The present invention is a communication system comprising a plurality of communication stations, and a modulation transmission line for transmitting a burst modulation signal between the plurality of communication stations in time division multiple access, wherein at least one of the plurality of communication stations comprises a sampling timing generating circuit for generating a sampling timing whose bits have been synchronized with the burst modulation signal before receiving the burst modulation signal transmitted from another communication station, a quasi-synchronous detecting circuit for quasi-synchronously detecting the burst modulation signal and for successively outputting a first vector signal on a phase plane, a sampling circuit for successively sampling the first vector signal obtained by the quasi-synchronous detecting circuit in a sampling timing generated by the sampling timing generating circuit, a phase rotation amount estimating circuit for estimating a phase rotation amount of the first vector signal in accordance with a correlation among a particular number of the first vector signals sampled by the sampling circuit, and a phase compensating circuit for compensating the phase of the first vector signal in accordance with the phase rotation amount estimated by the phase rotation amount estimating circuit.

According to the present invention, since a receiving station is provided with a means for generating a clock in synchronization with a burst signal and the station needs to sample only one point per symbol in an optimum timing, the data amount to be sampled for one burst signal can be minimized. In addition, unlike the conventional quasi-synchronous detection system, a great deal of calculations such as Fourier's transformation necessary for reproducing bit synchronism can be omitted. Only with the estimation of the rotation amount of the phase by using simple calculations, the received data can be correctly reproduced. With the minimized sampling data amount and remarkably simplified calculations, the apparatus can be simplified and the signal speed to be processed can be remarkably improved.

DESCRIPTION OF THE PREFERRED EMBODIMENT(S)

Figure 1:
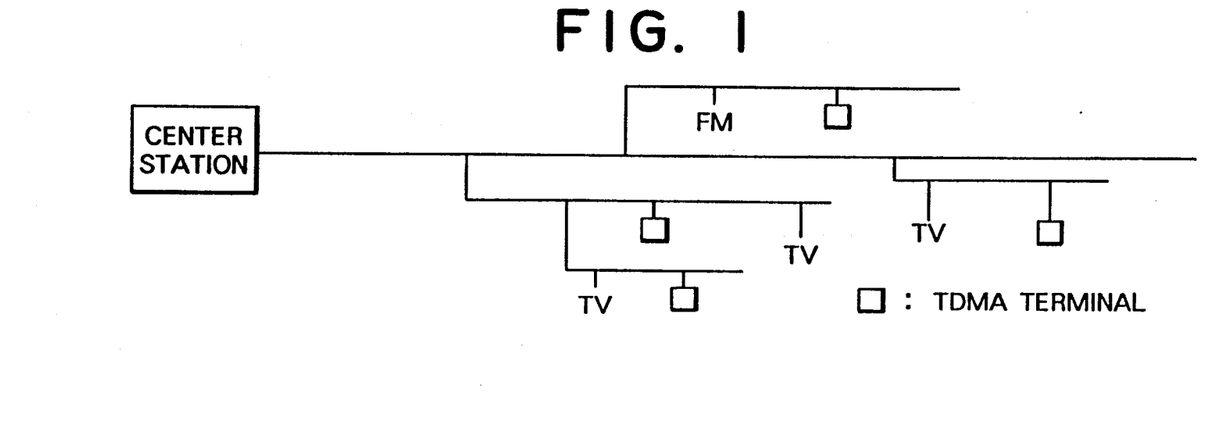
FIG. 1 is a schematic showing the overall construction of an embodiment according to the present invention.

With reference to the accompanying drawings, embodiments of the present invention will be described. At first, an example of a system to which the present invention is applied is described. As shown in FIG. 1, a center station is located at the root of the system. The system is connected to a plurality of terminal equipments located at ends of a tree shaped network through coaxial cables. More practically, this system is a multimedia network using bidirectional CATV technologies.

Figure 2:
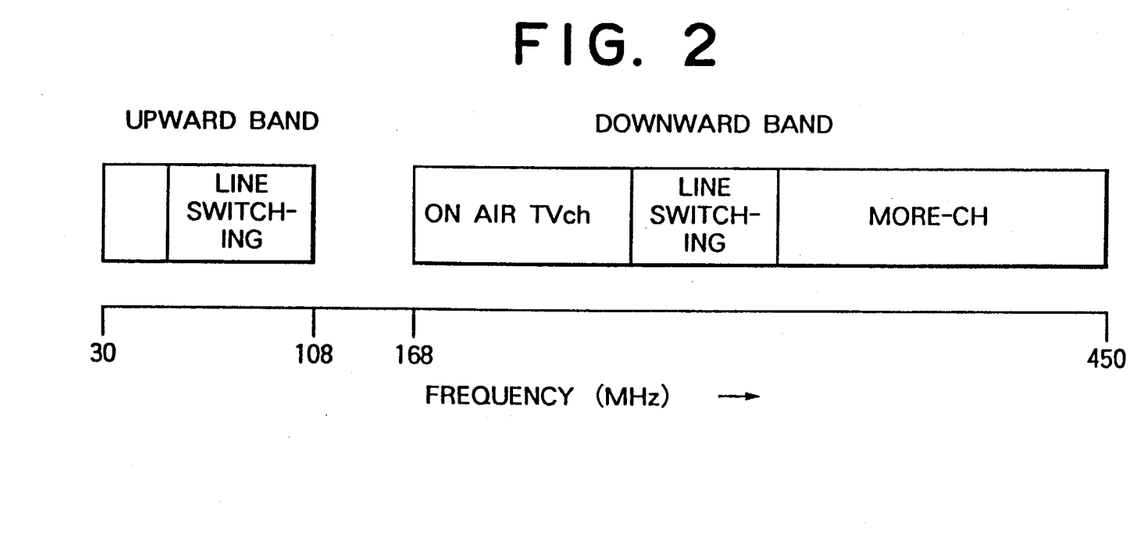
FIG. 2 is a schematic showing a data format over the transmission line of FIG. 1.

In the network, the frequency band of one coaxial cable is divided into an upward band and a downward band. In each band, line switching of sound, data, and so forth and various information such as video broadcasting are integrated by the frequency-division multiple modulation. FIG. 2 shows an example of frequency assignment.

The line switching system makes communications on assigned frequency channel in the TDMA system. When the TDMA communication is made, the farther the terminal equipment is located from the center, the earlier an upward signal is transmitted in accordance with a two-way signal transmission delay between the terminal equipment and the center. In this system, the signal transmission delay in the two ways between the terminal equipment and the center is measured in a satisfactorily high accuracy per symbol time (for example, an accuracy of 1/16 symbol time) with a delay control window set in a frame.

Figure 5:
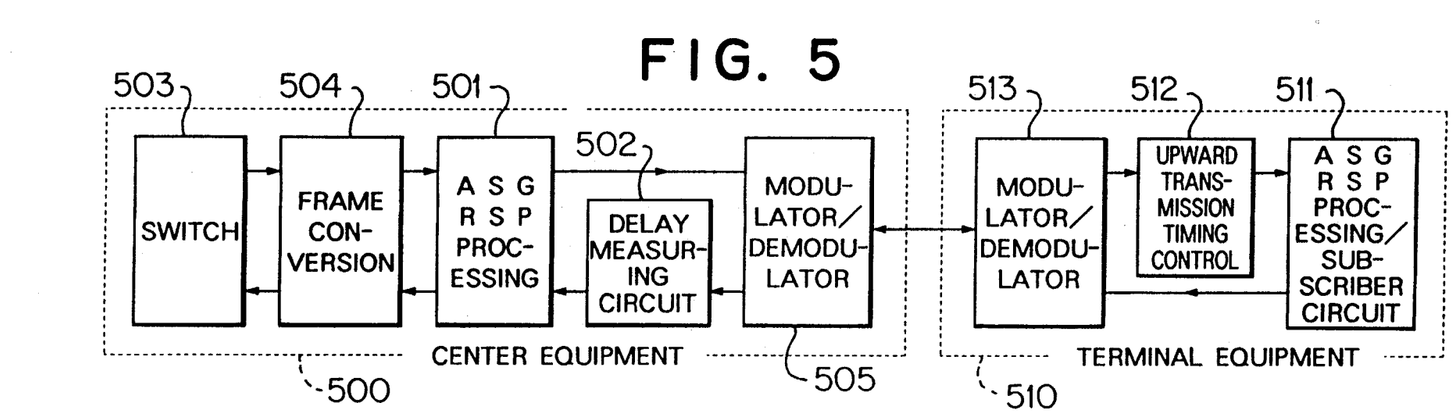
FIG. 5 is a block diagram showing outlined constructions of a center and terminal equipment.

Practically, the delay is measured in the following manner. As shown in FIG. 5, with a delay measurement commanding signal and a transmission timing notifying signal (hereinafter named the ASG signal)produced by ASG RSP processing circuit 501, the center equipment 500 commands each terminal equipment 510 to transmit a delay measurement signal (hereinafter named the response signal or RSP) for each frame. The terminal equipment 510 commanded with the ASG transmits the RSP produced by ASG RSP processing/subscriber circuit 511 to the center equipment 500 in the next frame. When the center equipment 500 receives the RSP, measures the delay measuring circuit 502 a timelag to the center's reference timing. The center equipment 500 informs the terminal equipment 510 of the transmission timing of the upward signal by using the ASG produced by ASG RAP processing circuit 511.

The upward transmission timing control 512 of the terminal equipment 510 controls the transmission timing of the upward signal (a time slot signal in a burst shape) in accordance with the delay measurement result. In other words, the farther the terminal equipment 510 is located from the center equipment 500, the earlier the terminal equipment 510 transmits the upward signal. In contrast, the nearer the terminal equipment 510 is located from the center equipment 500, the later the terminal equipment 510 transmits the upward signal. Thus, the upward signal from each terminal equipment 510 can arrive at the center equipment 500 at a particular timing without signal collisions. In FIG. 5, 503 is the switch network, 504 is the frame conversion circuit, and 505 and 513 are modulator/demodulators. The modulator/demodulator 505 of the center equipment 500 includes the center receiver shown in FIG. 6.

Since the transmission timing of the upward signal from each terminal equipment is controlled in a satisfactorily high accuracy per symbol time, the upward signal which arrives at the center can be completely synchronized with the clock of the center.

Figure 3:
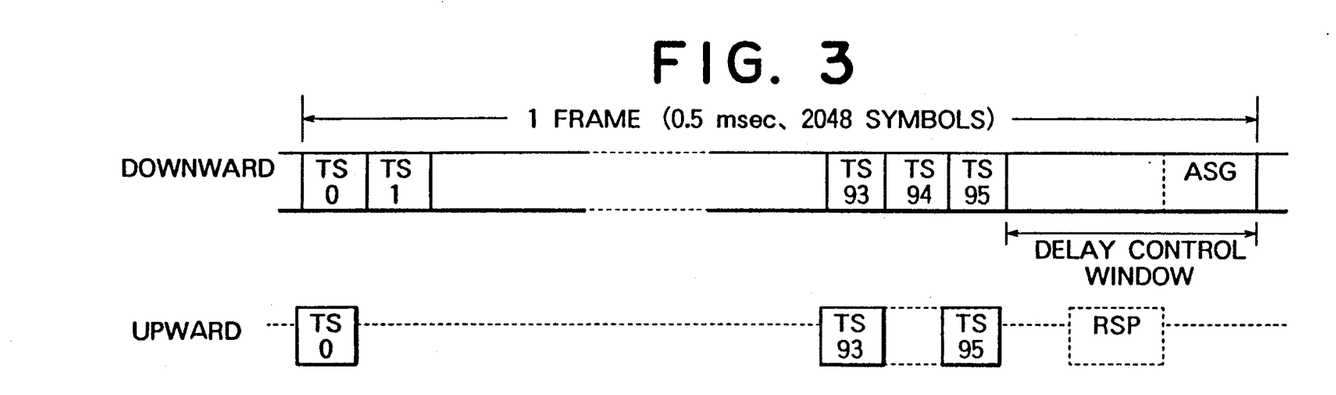
FIG. 3 is a schematic showing a frame construction.
Figure 4:
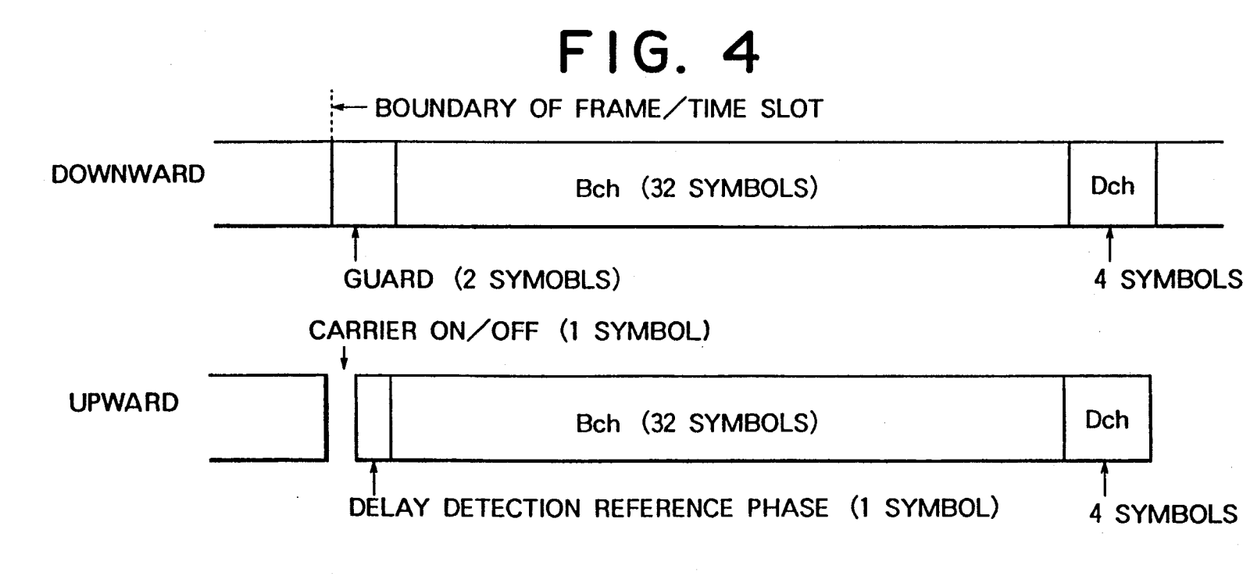
FIG. 4 is a schematic showing a time slot.

As the delay measurement and the upward signal transmission timing are accurately controlled, the center does not need to acquire the clock synchronism for each burst. Thus, except for one symbol assigned to the reference phase, the other symbols of each burst signal can be used for information. In addition, a maximum efficiency can be theoretically obtained. FIGS. 3 and 4 show a frame construction and a time slot construction, respectively.

The frame length is set to 1 msec for preventing the communication quality from deteriorating due to delay. The signal transmission rate is set to 4.096 Mbaud. The signal is differentially encoded and then QPSK modulated with a roll-off filter having a property of 45% or less. The occupied bandwidth is 6 MHz; the IF center frequency of the upward signal is 70 MHz; and the RF center frequency is 33 MHz. The time slot of each upward signal consists of a carrier-on for one symbol, a reference phase for one symbol, Bch data (64 kbps) for 32 symbols, Dch data (8 kbps) for four symbols, and a carrier-off for one symbol, which are allocated in the order thereof. Therefore, each slot has 39 symbols. However, since a carrier-on and a carrier-off between adjacent time slots are overlapped, the length of each time slot substantially becomes 38 symbols.

The above-mentioned TDMA system with high accuracy timing control efficiency has been disclosed as "Time Slotted Bus System with Control Window" in a paper of The Institute of Electronics, Information and Communication of Japan (Vol. J69-B, No. 10, pp. 1088-1091). In accordance with this system, the demodulator of the center controls the reception timing of the upward burst signal at the center, so that the clock of the center becomes an optimum sampling timing.

Then, a practical construction of the demodulator used in the center equipment of this system is described. In this embodiment, four-phased phase modulation is used for practically describing the present invention.

Figure 6:
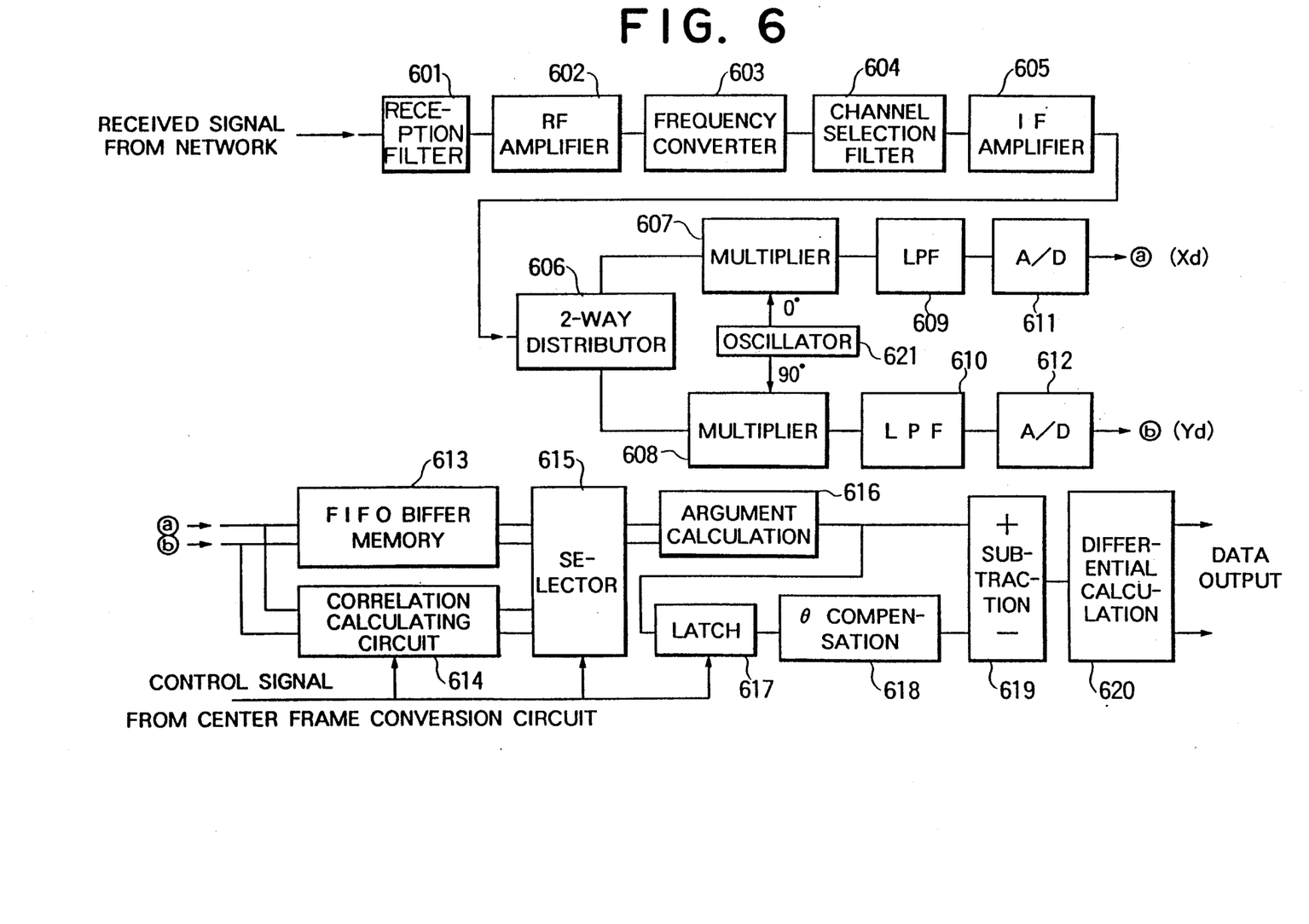
FIG. 6 is a block diagram showing the detail of a center receiver.

FIG. 6 shows a basic construction of a center receiver according to the present invention.

A signal which is transmitted through an upward band of a tree-brunch shaped bidirectional transmission line is sent to a reception filter 601 so as to roughly select channels. The resultant signal is amplified by an RF amplifier 602 and then converted by a frequency converter 603 into an intermediate frequency. From the resultant signal, only a required channel is obtained by a channel selection filter 603 which is for example a saw filter. The output from the channel selection filter 604 is amplified by an IF amplifier 605. The resultant signal is sent to two multipliers 607 and 608 through a two-way distributor 606. The intermediate frequency signal is equally input to the multipliers 607 and 608. In addition to the intermediate frequency signal, signals whose phases deviate by 90° each other (asynchronous carriers) are input from an oscillator 621 to the multipliers 607 and 608, respectively. In this embodiment, the phase of the asynchronous carrier which is input to the multiplier 608 is faster by 90° than the phase of the asynchronous carrier which is input to the multiplier 607. The frequency of the asynchronous carrier which is output from the oscillator 621 is nearly the same as the carrier frequency of the received signal. Each output of the multipliers 607 and 608 contains a component with a frequency twice as high as the carrier frequency along with the demodulated base band signal. By removing these higher harmonics with low-pass filters 609 and 610, the base band signals can be obtained.

However, as described above, since the output signal of the above mentioned oscillator is asynchronous with the carrier of the received signal, it cannot be assured that demodulation signals expressed with a vector (x, y) where x is the output of the LPF 609 and y is the output of the LPF 610 satisfy the relation of the positions expected in the synchronous detection, namely, the vector (x, y) is placed over a line with a slope of ±45° which passes through the origin of the x - y plane in the optimum sampling timing. Generally, the vector (x, y) has a particular offset value $\theta$ to the line with the slope of ±45° which passes through the origin on the x - y plane. Thus, as will be expressed with the following equations, x and y are mutually affected by correct demodulation signals I and Q.

$$x = I \cos \theta - Q \sin \theta$$

$$y = I \sin \theta + Q \cos \theta$$

As was described above, in the present invention, the sampling timing is accurately controlled. Thus, the outputs x and y of the LPF 609 and 610 are sampled in optimum timings for each symbol. This sampling is performed by A/D converters 611 and 612. These converters 611 and 612 convert analog data into digital values xd and yd (represented with multiple bits).

In accordance with the above mentioned time slot construction as a precondition, xd and yd are numbered in the following manner.

Reference phase symbols ... xd0, yd0

Information symbols (Bch, Dch) ... xd1, yd1 to xd36, yd36

The vectors (xd0, yd0) to (xd36, yd36) are input to a FIFO buffer memory 613 and a correlation calculating circuit 614. The correlation calculating circuit 614 outputs a vector (X, Y) with respect to the information of the offset angle $\theta$ in accordance with the 37 vectors (xd0, yd0) to (xd36, yd36). An example of the procedure for calculating the vector (X, Y) in accordance with the vectors (xd0, yd0) to (xd36, yd36) is described with reference to a block diagram showing a construction of a correlation calculating circuit of FIG. 7.

Figure 7:
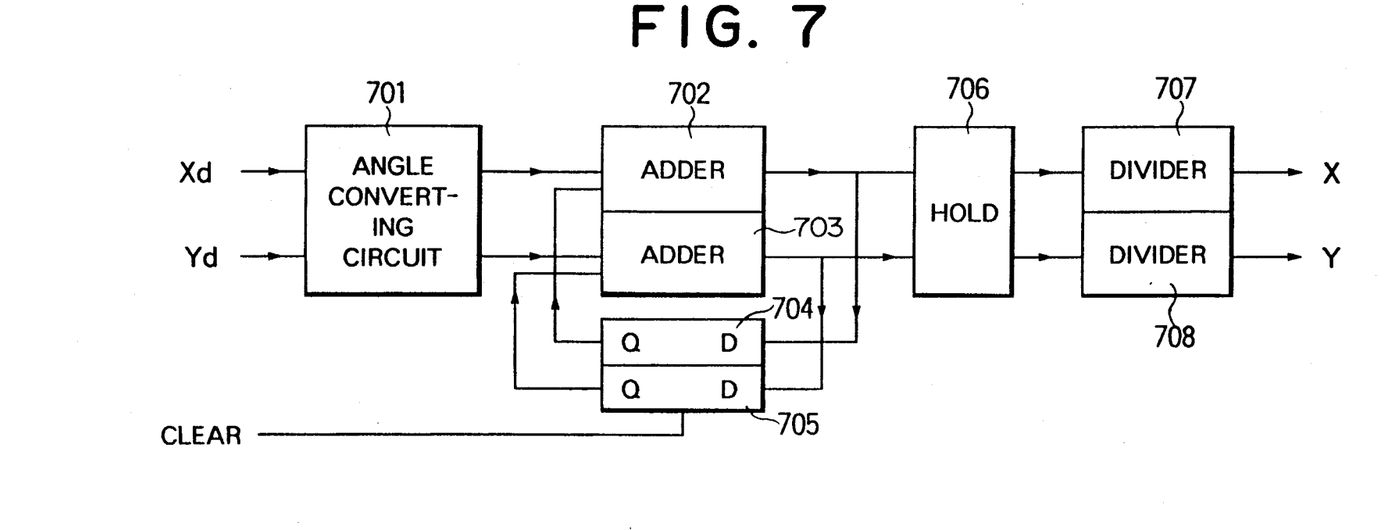
FIG. 7 is a block diagram showing the detail of the correlation calculating circuit of FIG. 6.

With the input data xdk, ydk (where k = 0, 1, ..., 36), the angle converting circuit 701 generates Xk, Yk with an argument four times as large as thereof. Practically, Xk and Yk are expressed with the following equation.

$$Xk + iYk = (xdk + iydk)^4 / f(xdk, ydk)$$

where i is the imaginary unit; f (xdk, ydk) is a function for adjusting the magnitude of the vector (Xk, Yk) and is expressed with an equation $f(xdk, ydk) = |xdk + iydk|^m, (3 < m < 4)$. When m = 4, the vector (Xk, Yk) becomes a unit vector with an argument four times as large as that of the input vector (xdk, ydk). When m = 3, the vector (Xk, Yk) has an argument four times as large as that of the input vector (xdk, ydk) with the same magnitude thereof. If the argument of the vector (xdk, ydk) deviates by $\theta$ from the vector (Ik, Qk) with an argument of 45°×n (where n = 1, 3, 5, and 7), the vector (Xk, Yk) has an argument of 180°+4$\theta$ (regardless of n). (Actually, this argument has a particular distribution around 180°+4$\theta$ due to noise over the transmission line or the like.)

Although the angle converting circuit 701 has been already functionally described, if each of xdk and ydk is 8-bit data, when the circuit is constructed with a table made of a ROM (read only memory) with 16-bit input (address line) and 16-bit output, the size of the circuit can be reduced and the speed thereof can be improved. In addition, the contents of the function f (xdk, ydk) and the conversion function from (xdk, ydk) into (Xk, Yk) can be freely set.

Then, flip flop circuits 704 and 705 and adders 702 and 703 will be described. When the first vector (xd0, yd0) is input, the flip flop circuits 704 and 705 are reset. Vectors (X0, Y0) and (0, 0) are input to the adders 702 and 703. The adders 702 and 703 output the added results (X0, Y0). The resultant values are sent to the flip flop circuits 704 and 705 and then held thereby. In the next step, the vector (X1, Y1) which is converted from the vector (xd1, yd1) and the output vectors (X0, Y0) from the flop flops 704 and 705 are input and their sums (X0+X1, Y0+Y1) are output. These values are held by the flip flop circuits 704 and 705 again. After this cycle is repeated, when the adders 702 and 703 output (X0+X1+...+X36, Y0+Y1+...+Y36), the hold circuit 706 holds these values and output them to dividers 707 and 708.

The dividers 707 and 708 divide this vector by 37, which is the number of input data pieces, and then output an average vector (X, Y) of the vectors (X0, Y0) to (X36, Y36). With respect to the average vector (X, Y), as will be described later in more detail, since the argument thereof is an amount to be used, when the average vector (X, Y) does not exceed the dynamic range of an argument calculating circuit 616, it is not always necessary to divide the above mentioned vector by 37. When vectors with the magnitude of the unit vector can be used, the same effect of the division by 32 (=$2^5$) can be accomplished only by shifting down other than the sign bit by 5 bits without necessity of the dividers 707 and 708. Since the shift-down by 5 bits can be performed simply by means of a wiring, no special circuitry is required.

After 37 vectors (xdk, ydk) (k=0, 1, ..., 36) are input in the above mentioned manner, the correlation calculating circuit outputs a vector (X, Y) with an argument of $180° + 4\theta$.

Then, the block diagram shown in FIG. 6 will be further described.

When the 37 vectors (xdk, ydk) (k=0, 1, ..., 36) are input to the correlation calculating circuit 614 are input and then the vector (X, Y) with the argument of $180° + 4\theta$ is output, a selector 615 selects an input signal from the correlation calculating circuit and outputs the selected signal to an argument calculating circuit 616. The argument calculating circuit 616 outputs the argument of the input vector (X, Y). The argument (0° or greater or less than 360°) can be calculated as follows.

arctan (Y/X) (when X>0 and Y≧0);
90° (when X=0 and Y>0);
arctan (Y/X)+180° (when X<0)
270° (when X=0 and Y<0);
arctan (Y/X)+270° (when X>0 and Y<0)

However, like the angle converting circuit 701, it is desirable to construct the argument calculating circuit 616 with a ROM from viewpoints of small size, low cost, and high speed.

At that time, the argument calculating circuit 616 outputs a code representing $180° + 4\theta$. The argument $\alpha$ is encoded to a binary code L (Lm-1, Lm-2, ..., L1, L0) which satisfies the following equation.

$$V_L = \left( \sum_{i=0}^{m-1} 2^i L_i \right) / 2^m$$

where
Li=0 or 1
$V_L \leq \alpha/360° < V_{L+1}$

In other words, when L=(0, 0, ..., 0), $\alpha=0°$; when L =(1, 1, ..., 1), $\alpha=(1-1/2^m)\times 360°$.

Figure 8:
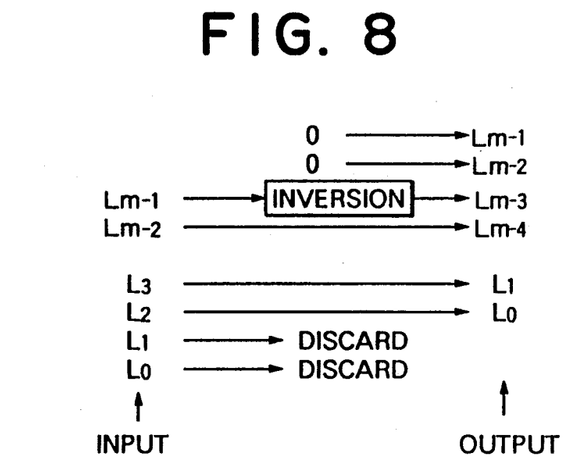
FIG. 8 is a schematic describing Θ compensation.

A latch 617 holds a code L ($\theta$) which is equivalent to the argument $180° + 4\theta$ and outputs it to a $\theta$ compensator 618. The $\theta$ compensator 618 inverts the most significant bit Lm-1 ($\theta$) of the code L ($\theta$). Thereby, the offset term 180° of the argument $180° + 4\theta$ can be compensated (removed). Thereafter, the $\theta$ compensator 618 shifts down this value by 2 bits. Thus, the angle is quartered and the phase deviation $\theta$ between the received carrier and an oscillator 621 is obtained. The $\theta$ compensator 618 can be accomplished by for example a circuit as shown in FIG. 8.

Figure 9:
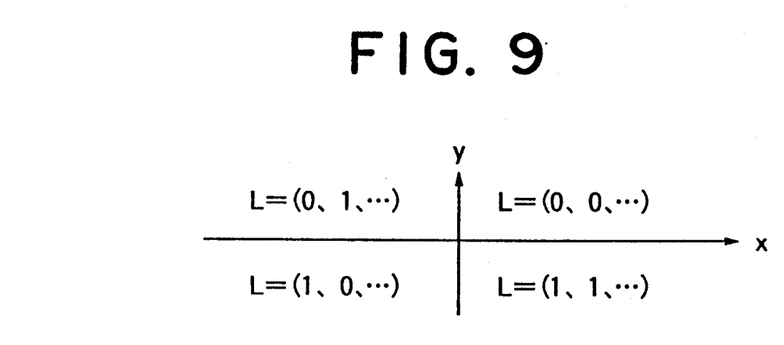
FIG. 9 is an auxiliary schematic describing modulation.

When the phase deviation amount $\theta$ of the quasi-synchronous detector is obtained, the selector 615 selects the output of the FIFO buffer memory 613 and thereby outputting the vectors (xd0, yd0) to (xd36, yd36) to the argument calculating circuit 616 in succession. The argument calculating circuit 616 outputs arguments $\phi 0$ to $\phi 36$ to a subtracter 619. The subtracter 619 subtracts the precalculated $\theta$ from the argument $\phi i$ and then outputs the resultant value to a difference calculating circuit 620. As the result of this subtraction, the arguments of the input vectors (xdi, ydi) are compensated to $\pm 45°$ and $\pm 135°$. Thus, since the compensated arguments are placed at the center of each quadrant from the first quadrant to the forth quadrant as shown in FIG. 9, the phase of a modulation signal can be determined necessarily and sufficiently by detecting 2 most significant bits of the code L which is compensated with $\theta$. The subtracter 619 outputs the 2 bits. Since the modulation signal has been differentially encoded, a difference calculating circuit 620 performs a difference operation for the output of the subtracter 619 and thereby obtaining the original data.

In the above mentioned system, since the apparatus according to the present invention does not require the multi-sampling and complicated numeric operations which are required in the conventional quasi-synchronous detection type receivers, it can process data at much higher speed in a smaller circuit scale than those receivers. When the receiver according to the present invention is constructed with a CMOS or a TTL random logic which are currently available, it can receive data at a transmission rate as high as 20 Mbps, which is around 100 times as high as the transmission rate of the conventional receivers.

Then, the effect of noise and the deviation of frequencies are discussed.

As was described above, the output vectors (xd, yd) of the A/D converters 611 and 612 vary at random in both amplitude and argument due to noise over the transmission line or the like. Such noise affects not only the output vector (X, Y) of the correlation calculating circuit 614, but also $\theta$ obtained therefrom. However, the vector (X, Y) is an average of 37 data pieces, the noise energy contained in $\theta$ becomes 1/37. Thus, CNR is deteriorated substantially by around 0.1 dB (10 log (1+1/37)) compared with the real CNR. However, since the CNR of the apparatus according to the present invention is improved by 2.2 dB compared with the delay detector used in the conventional "Time Slotted Bus System with Control Window", thus the CNR to BER property is improved by 2.2 dB (2.3 dB−0.1 dB=2.2 dB). In addition, although the phase of the demodulation eye pattern is rotated on the x-y plane, since the demodulation eye pattern is equal to the eye pattern of the synchronous detection, the horizontal opening of the eye pattern is larger than that of the synchronous detection. Thus, the system according to the present invention can more withstand the deviation of the sampling timing than the conventional systems. From this viewpoint, the improvement of more than 2.2 dB in the total transmission characteristic can be accomplished.

Then, the relation between the carrier frequency of a reception signal and the frequency of the oscillator 621 will be discussed. Generally, these frequencies do not match. In addition, the phase difference $\theta$ of both the carriers is not a constant, but a variable for a time. The variation of $\theta$ in one time slot in the above mentioned embodiment is as follows.

IF center frequency of modulator and demodulator = 70 MHz;
local frequency of modulator and demodulator = 103 MHz;
RF frequency = 33 MHz When the frequency accuracy of each signal source is ±10 ppm, the maximum frequency deviation between the reception signal carrier converted into the intermediate frequency of the demodulator and the frequency of the oscillator 621 becomes at most 3460 Hz. The period from the reference phase to the last information bit in one time slot is $36/4.096$ MHz $= 8.79$ μsec. During this time period, $\theta$ varies for 10.9°. Thus, for $\theta$, a phase deviation of max. ±5.5° takes place between the beginning and the end of the time slot and thereby substantially narrowing the eye pattern. However, since the opening of the eye pattern is 90% (sin (45°−5.5°)/sin 45°), it is equivalent to a deterioration of 0.46 dB in CNR. Therefore, from the viewpoint of the improvement of CNR conducted for the above mentioned quasi-synchronous detection, without necessity of the compensation of the frequency deviation, the improvement of 1.7 dB or more in the total characteristic can be accomplished. Of course, in consideration of the frequency deviation, by representing $\theta$ with a linear function for the number of symbols from a time t or the beginning of the time slot, the deterioration of above mentioned 0.46 dB can be removed.

Figure 10:
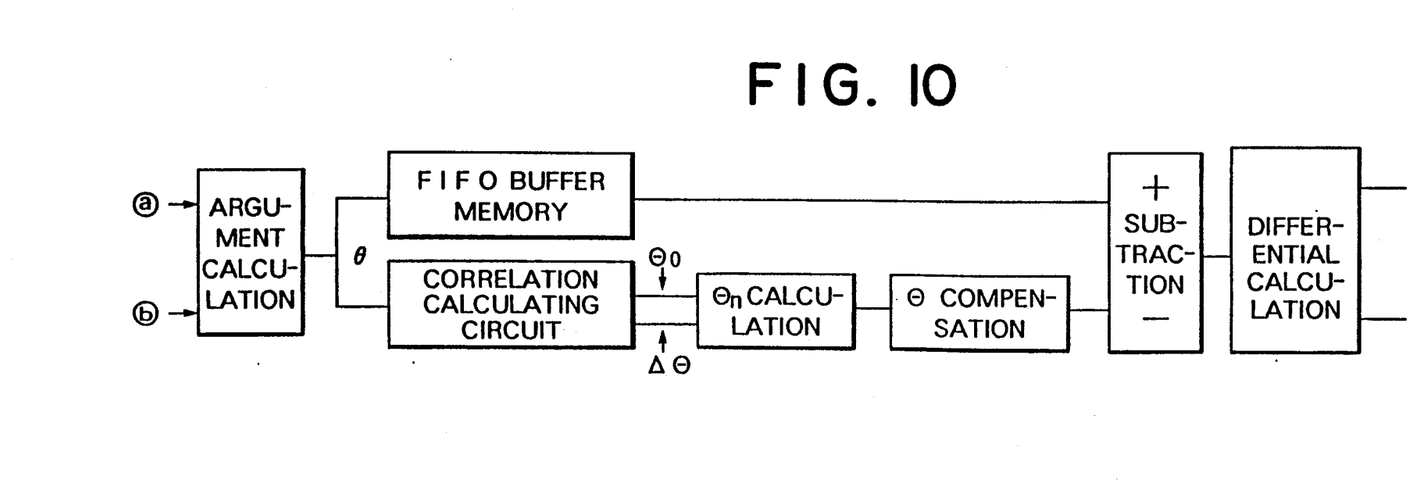
FIG. 10 is a block diagram of a circuit for removing deterioration.

FIG. 10 shows a block diagram for representing a deviation phase $\theta$ with a linear function for the number of symbols from the beginning of a time slot and for removing the above mentioned deterioration.

The correlation calculating circuit outputs the following data with $\theta_O$ to $\theta_m$ (where m is 36 in this example).

$$\Theta_O = (\Sigma n^2 \Sigma 4\theta n + \Sigma n \Sigma n4\theta n)/d$$

$$\Delta\Theta = (\Sigma n \Sigma 4\theta n + \Sigma 1 \Sigma n4\theta n)/d$$

where $\Theta n = \Theta_O + n \cdot \Delta\Theta$ due to linear regression; and $d = \Sigma n^2 \Sigma 1 - (\Sigma n)^2$; n ranging from 0 to m for each $\Sigma$.

In other words, the correlation calculating circuit comprises a circuit for calculating $\Sigma 4\theta n$ and $\Sigma n4\theta n$ for $\theta_O$ to $\theta_m$ being input and a circuit for calculating $\Theta_O$ and $\Delta\Theta$ in accordance with the above mentioned equations.

The $\Theta n$ calculating circuit successively outputs $\Theta n = \Theta_O + n \cdot \Delta\Theta$ by using $\Theta_O$ and $\Delta\Theta$ being output from the correlation calculating circuit.

Like the $\theta$ compensating circuit shown in FIG. 6, the $\Theta$ compensating circuit obtains $\theta cn$ which is a compensated value of $\theta n$ from $\Theta n$ by using the following equation.

$$\theta cn = \Theta n/4 - 45°$$

The subtraction circuit subtracts $\theta cn$ from $\theta n$ which is successively output from the FIFO buffer memory. The outputs are placed at the centers of the first quadrant to the fourth quadrant. The operations that follow are the same as those of the embodiment described with reference to FIG. 6.

In this embodiment, to obtain $\Theta_O$ and $\Delta\Theta$ from $\Sigma 4\Theta n$ and $\Sigma n4\theta n$, multiplications are required. (When m is determined, since the coefficients of d, $\Sigma 4\sigma n$, and $\Sigma n4\theta n$ are constant, these multiplications can be calculated in advance.) Although these calculations take a long time, since they are required once every m symbols, they do not affect the operation speed of the system. When the above mentioned ROM table is used and the circuitry is constructed with a CMOS or TTL random logic which are currently available, a data rate as high as 20 to 30 Mbaud is attainable, which is 100 times as high as the speeds of the conventional apparatuses. Then, a method for accomplishing delay measurement in a high accuracy will be additionally described.

The key point of the delay control is to measure a two-way signal transmission delay time between the center station and each terminal equipment in an accuracy which is satisfactorily higher than a one-bit time so that the farther the terminal equipment is located from the center station, the earlier an upward signal is transmitted to the terminal equipment. In the conventional delay control systems based on the delay detection systems, it is possible to detect the reference point (the edge of the phase inverted bit at the beginning of RSP) of a delay measurement signal (RSP) on either the I channel or the Q channel. However, in the quasi-synchronous detection systems like the present invention, since the oscillator 621 does not correlate with the phase of a carrier of the reception RSP, when the signal of the oscillator 621 deviates from a carrier of the reception RSP by 45° in comparison with the ideal condition, the signal on either the I channel or the Q channel does not change and thereby the edge may be undetectable.

Figure 11:
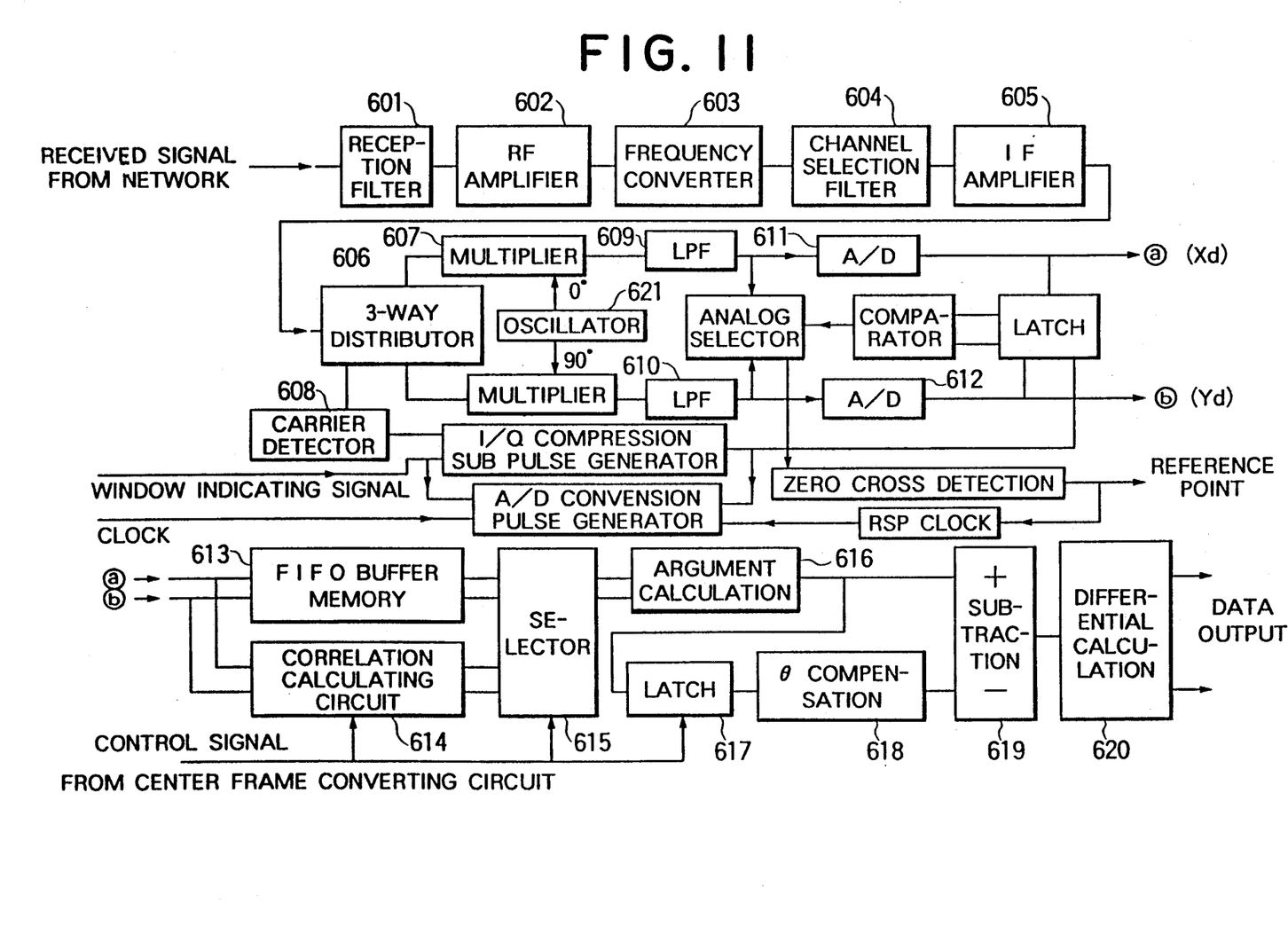
FIG. 11 is a block diagram of a circuit for detecting RSP.
Figure 12:
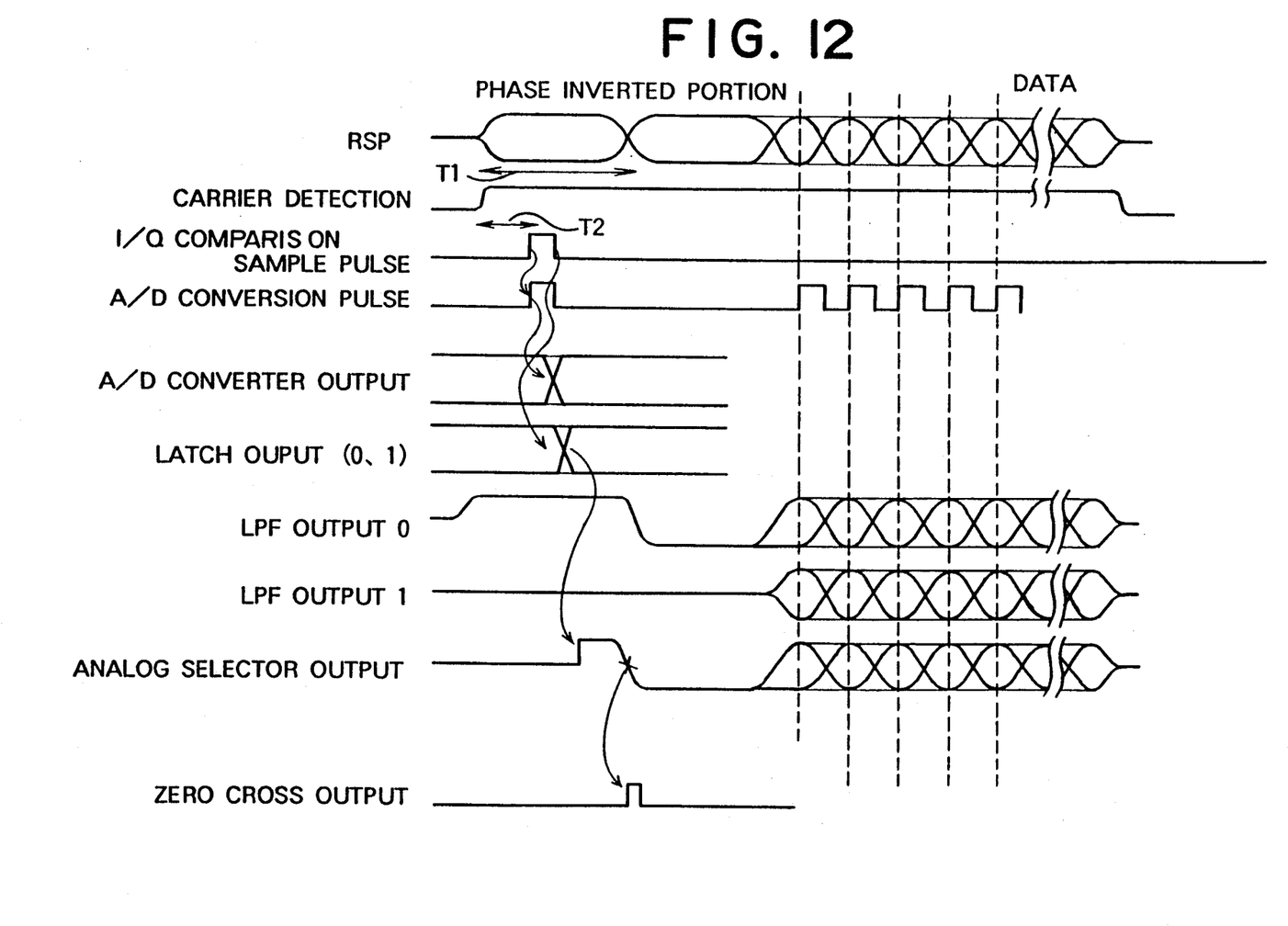
FIG. 12 is a chart showing signal waveforms of the circuit of FIG. 11.

FIG. 11 shows a block diagram for the timing detection system suitable for the quasi-synchronous detection having such features. The components illustrated in FIG. 11 with the same reference numerals as components illustrated in FIG. 6 have the same functions. FIG. 12 shows signal waveforms used in FIG. 11. With the circuit as shown in FIG. 11, only a carrier in the delay measurement window is detected. A time T2 is set so that the LPF output becomes stable and the trailing edge is followed by the phase reversed portion. In the figure, LPF output 1 has been selected from the last time. When LPF output 0 is selected as the result of the comparison of absolute values of the digital data, a waveform as shown in FIG. 12 takes place. After the zero cross of the analog selector is detected, the A/D converter generates data sampling pulses that follow.

As was described above, according to the present invention, in a high performance burst communication where a preamble is removed over a modulation transmission line, since each symbol is sampled only once in an optimum timing for performing a quasi-synchronous detection with high performance for bit error rate, the sampling circuit can be simplified. In addition, since the sampled data is sufficiently and necessarily a minimum amount for determining a sign and a physical amount to be estimated can be limited to the phase of a sampled vector and if necessary a center frequency, the estimation only requires calculations for the phase or at most those for linear regression. Thus, the calculations can be remarkably reduced. Consequently, the sampling circuit can be simplified and the size of the demodulator can be reduced. Alternatively, in the same hardware scale of the conventional system, a burst signal can be demodulated at a speed 100 times as high as the conventional systems. Thereby, significant effects can be practically achieved.

What is claimed is:
1. A communication system having a plurality of communication stations and a modulation transmission line for transmitting a burst modulation signal between said plurality of communication stations in time division multiple access, at least one of said plurality of communication stations comprising:

sampling timing generating means for generating a sampling timing which is bit-synchronized with said burst modulation signal before receiving said burst modulation signal transmitted from another communication station;

quasi-synchronous detecting means for quasi-synchronously demodulating said burst modulation signal and outputting a first vector signal on a phase plane;

sampling means for successively sampling said first vector signal obtained by said quasi-synchronous detecting means in a sampling timing generated by said sampling timing generating means;

phase rotation amount estimating means for estimating a phase rotation amount of said first vector signal in accordance with a correlation among a particular number of said first vector signals sampled by said sampling means; and     phase compensating means for compensating the phase of said first vector signal in accordance with the phase rotation amount estimated by said phase rotation amount estimating means.

2. The communication system as set forth in claim 1, said system further comprising storage means for storing said first vector signals sampled by said sampling means.

3. The communication system as set forth in claim 2, said storing means comprising a digital memory,     said sampling means comprising A/D converter means for converting said vector signals into digital signals, said digital signals being output from said A/D converter means and stored in said digital memory.

4. The communication system as set forth in claim 1, at least one of said plurality of communication stations comprising:

reference timing generating means for generating a reference timing of said communication system;and     another communication station comprises transmission timing controlling means for controlling a transmission timing of said burst modulation signal so that said burst modulation signal which arrives at said communication station comprising said reference timing generating means in a particular timing.

5. The communication system as set forth in claim 4, said sampling timing generating means being arranged to control a transmission timing of said transmission timing controlling means of said another communication station in an accuracy higher than one cycle of a data clock.

6. The communication system as set forth in claim 1, said phase rotation amount estimating means comprising:

vector signal converting means for converting a plurality of first vector signals sampled by said sampling means into a plurality of second vector signals; and     statistical processing executing means for executing a particular statistical processing of said plurality of second vector signals converted by said vector signal converting means.

7. The communication system as set forth in claim 6, said burst modulation being four-phased phase modulation, said vector signal converting means comprising:

first phase converting means for quadrupling a phase of said first vector signal and for outputting the resultant signal as said second vector signal,     said statistical processing executing means comprising:

average value vector signal calculating means for obtaining an average value vector signal of said plurality of second vector signals; and     second phase converting means for quartering a phase of said average value vector signal calculated by said average value vector signal calculating means.

8. The communication system as set forth in claim 6, said communication system further comprising a memory for storing data which is used to convert said first vector signals into said second vector signals.

9. The communication system as set forth in claim 1, said communication system further comprising a memory for storing a table for use with said phase rotation amount estimating means.

10. The communication system as set forth in claim 1, said communication system further comprising a memory for storing a table for use with said phase compensating means.

11. The communication system as set forth in claim 4, said transmission timing controlling means comprising transmission delay time measuring means for measuring a transmission delay time of said burst modulation signal between said communication station having said reference timing generating means and the other communication station.

12. The communication system as set forth in claim 11, said transmission delay time measuring means comprising:

carrier inverting means for inverting a carrier of said delay time measuring burst signal a time T1 after the carrier of said delay time measuring burst signal is turned on;

determining means for determining a value which is not smaller than other absolute values as an absolute value from components of a first vector signal which is output from said quasi-synchronous detecting means a time T2 after the carrier of said delay time measuring burst signal is detected or until the time T2 after the carrier is turned on, the T2 being shorter than the time T1; and     zero cross point detecting means for detecting a zero cross point of the component determined by said determining means.

13. The communication system as set forth in claim 1, said phase rotation amount estimating means comprising calculating means for performing a costas calculation for said first vector signal.

14. A demodulator for demodulating a burst modulation signal transmitted by time division multiplex in a communication system comprising:

sampling timing generating means for generating a sampling timing which is bit-synchronized with said burst modulation signal before receiving said burst modulation signal;

quasi-synchronous detecting means for quasi-synchronously detecting said burst modulation signal and for successively outputting a first vector signal on a phase plane;

sampling means for successively sampling said first vector signal obtained by said quasi-synchronous detecting means in sampling timing generated by said sampling timing generating means;

phase rotation amount estimating means for estimating a phase rotation amount of said first vector signal in accordance with a correlation among a particular number of said first vector signals sampled by said sampling means;

phase compensating means for compensating the phase of said first vector signal in accordance with the phase rotation amount estimated by said phase rotation amount estimating means; and means for demodulating said successively sampled first vector signal according to the first vector signal compensated by said phase compensating means.

15. The demodulator as set forth in claim 14, said demodulator further comprising storage means for storing said first vector signals sampled by said sampling means.

16. The demodulator as set forth in claim 14, said phase rotation amount estimating means comprising:

vector signal converting means for converting a plurality of first vector signals sampled by said sampling means into a plurality of second vector signals; and statistical processing executing means for executing a particular statistical processing of said plurality of second vector signals converted by said vector signal converting means.

17. The demodulator as set forth in claim 16, said burst modulation being four-phased phase modulation, said vector signal converting means comprising first phase converting means for quadrupling a phase of said first vector signal and for outputting the resultant signal as said second vector signal, said statistical processing executing means comprising:

average value vector signal calculating means for obtaining an average value vector signal of said plurality of second vector signals; and second phase converting means for quartering a phase of said average value vector signal calculated by said average value vector signal calculating means.

18. The demodulator as set forth in claim 14, said phase rotation amount estimating means comprising calculating means for performing a costas calculation for said first vector signal.

* * * * *

UNITED STATES PATENT AND TRADEMARK OFFICE
CERTIFICATE OF CORRECTION

PATENT NO. : 5,291,527
DATED : March 01, 1994
INVENTOR(S) : Hideaki Haruyama

It is certified that error appears in the above-indentified patent and that said Letters Patent is hereby corrected as shown below:

Claim 4, column 11, line 43, insert a space after ";".

Claim 13, column 12, line 56, change "costas" to --Costas--.

Claim 18, column 14, line 24, change "costas" to --Costas--.

Signed and Sealed this

Eighteenth Day of October, 1994

Attest:

BRUCE LEHMAN

Attesting Officer    Commissioner of Patents and Trademarks